(12) United States Patent
Joo et al.

(10) Patent No.: US 9,720,638 B2
(45) Date of Patent: Aug. 1, 2017

(54) DISPLAY SYSTEM AND CONTROL METHOD OF THE SAME

(71) Applicant: SAMSUNG ELECTRONICS CO., LTD., Suwon-si (KR)

(72) Inventors: Sung-yong Joo, Yongin-si (KR); Jin-hyung Lee, Anyang-si (KR); Gil-yong Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/818,831

(22) Filed: Aug. 5, 2015

(65) Prior Publication Data

US 2016/0041805 A1 Feb. 11, 2016

(30) Foreign Application Priority Data

Aug. 5, 2014 (KR) ........................ 10-2014-0100526

(51) Int. Cl.
*G06F 3/14* (2006.01)

(52) U.S. Cl.
CPC ..... *G06F 3/1446* (2013.01); *G09G 2300/026* (2013.01); *G09G 2300/04* (2013.01); *G09G 2310/08* (2013.01); *G09G 2330/026* (2013.01)

(58) Field of Classification Search
CPC .... G06F 3/1446; G06F 1/3293; G06F 1/3234; G06F 1/3287; G06F 1/329; G06F 1/3203; G06F 1/26; G09F 9/3026; G09G 2300/023; G09G 2300/026; G09G 2356/00; G09G 2360/04; G09G 2360/06; G09G 2300/0413; G09G 2300/0439; G09G 2300/0443; G09G 2300/0447; G09G 2300/0452; Y02B 60/12; Y02B 60/1282; Y02B 601/1278; Y02B 60/1285; G06K 15/4055; Y04S 20/225
USPC ................... 345/1.1, 205, 173; 713/324, 330
See application file for complete search history.

(56) References Cited

U.S. PATENT DOCUMENTS

| 6,237,290 | B1 | 5/2001 | Tokimoto et al. | |
| 7,257,724 | B2 * | 8/2007 | Lehr | G05F 1/66 709/224 |
| 7,502,950 | B1 * | 3/2009 | Brands | G06F 3/1446 323/234 |
| 7,514,816 | B2 * | 4/2009 | Bemat | H02J 1/102 307/64 |
| 8,820,972 | B2 | 9/2014 | Mollnow et al. | |
| 9,069,519 | B1 * | 6/2015 | Hall | G06F 3/1446 |

(Continued)

FOREIGN PATENT DOCUMENTS

| KR | 2000-0029310 A | 5/2000 |
| KR | 10-0975970 B1 | 8/2010 |

(Continued)

*Primary Examiner* — Grant Sitta
(74) *Attorney, Agent, or Firm* — Sughrue Mion, PLLC (57) ABSTRACT

Provided are a display system including a plurality of display apparatuses and a control method of the same. The display system including a plurality of display apparatuses comprises a first display apparatus configured to display an image to constitute a multi-screen, and receive power from a single power source; and a second display apparatus configured to display an image to constitute the multi-screen, and receive power from the single power source, wherein the second display apparatus starts operation after the first display apparatus enters a normal driving state.

7 Claims, 8 Drawing Sheets

(56) References Cited

U.S. PATENT DOCUMENTS

| | | | |
|---|---|---|---|
| 9,141,329 B1* | 9/2015 | Reicher | G06F 3/1446 |
| 9,207,904 B2* | 12/2015 | Hall | G06F 3/147 |
| 2004/0169618 A1* | 9/2004 | Nakai | G02F 1/1362 |
| | | | 345/1.1 |
| 2005/0067902 A1* | 3/2005 | Bemat | G06F 1/3203 |
| | | | 307/140 |
| 2005/0134525 A1* | 6/2005 | Tanghe | G06F 3/1446 |
| | | | 345/1.1 |
| 2005/0253777 A1* | 11/2005 | Zehner | G06F 3/1446 |
| | | | 345/1.3 |
| 2005/0264471 A1* | 12/2005 | Yamazaki | G06F 3/1446 |
| | | | 345/1.1 |
| 2006/0256033 A1* | 11/2006 | Chan | G09G 5/395 |
| | | | 345/1.1 |
| 2007/0269168 A1* | 11/2007 | Park | G09G 3/3208 |
| | | | 385/92 |
| 2008/0024387 A1* | 1/2008 | Maskeny | G09G 3/32 |
| | | | 345/1.1 |
| 2008/0114998 A1* | 5/2008 | Ferentz | H04L 12/12 |
| | | | 713/324 |
| 2009/0096711 A1* | 4/2009 | Jang | G06F 3/1446 |
| | | | 345/1.3 |
| 2009/0312884 A1* | 12/2009 | Li | G06F 3/1446 |
| | | | 700/295 |
| 2010/0321919 A1 | 12/2010 | Yang | |
| 2011/0298843 A1* | 12/2011 | Hajjar | G09G 5/10 |
| | | | 345/690 |
| 2014/0152902 A1* | 6/2014 | Morrisseau | H05B 33/0815 |
| | | | 348/739 |
| 2014/0217427 A1 | 8/2014 | Yuan et al. | |

FOREIGN PATENT DOCUMENTS

| | | |
|---|---|---|
| KR | 10-2010-0100986 A | 9/2010 |
| KR | 10-0997532 B1 | 11/2010 |
| KR | 10-2012-0042845 A | 5/2012 |
| KR | 10-2013-1039938 A | 12/2013 |

* cited by examiner

DISPLAY SYSTEM AND CONTROL METHOD OF THE SAME

CROSS-REFERENCE TO RELATED APPLICATION

This application claims priority from Korean Patent Application No. 10-2014-0100526, filed on Aug. 5, 2014 in the Korean Intellectual Property Office, the disclosure of which is incorporated herein in its entirety by reference.

BACKGROUND

Field

Apparatuses and methods consistent with exemplary embodiments relate to a display system and a control method of the same, and more particularly to a display system and a control method of the same, in which a plurality of display apparatuses display a multi-screen.

Description of the Related Art

A display system of the related art may form a multi-screen through a plurality of display apparatuses in order to provide a more improved image to a user.

The plurality of display apparatuses may be individually connected to power sources and receive power. However, it takes much time and costs to connect the plurality of display apparatuses and the power sources, respectively. Thus, it is efficient to supply power from a single power source to the plurality of display apparatuses. Each display apparatus instantaneously needs a higher current at an initial operation than that in a normal operation.

However, the supplied power has a limited amount of electricity. Therefore, if the plurality of display apparatuses are all driven at the initial operation, a problem may arise in supplying the power since the current higher than that in the normal operation is instantaneously used.

SUMMARY

Exemplary embodiments address at least the above problems and/or disadvantages and other disadvantages not described above. Also, the exemplary embodiments are not required to overcome the disadvantages described above, and may not overcome any of the problems described above.

According to an aspect of an exemplary embodiment, there is provided a display system including a plurality of display apparatuses, the display system including: a first display apparatus configured to display an image to constitute a multi-screen and receive power from a single power source; and a second display apparatus configured to display an image to constitute the multi-screen, and receive power from the single power source, wherein the second display apparatus starts operation after the first display apparatus enters a normal driving state.

The first display apparatus may output a control signal informing the normal driving state when entering the normal driving state, and the second display apparatus may start operation by receiving the control signal from the first display apparatus.

The first display apparatus may receive power from the single power source and output a power signal corresponding to the normal driving state when entering the normal driving state, and the second display apparatus may start operation by receiving the power signal from the first display apparatus.

The first display apparatus may include a first connector including a first power line connected to the single power source, and the second display apparatus may include a second connector including a second power line connected to the first power line of the first connector.

The first display apparatus may include a first power supply configured to supply the power; a first auxiliary power supply configured to assist the first power supply; and a first switch configured to perform a switching operation so that the power from the single power source is input to at least one of the first power supply and the first auxiliary power supply.

The second display apparatus may include a second power supply configured to supply the power; a second auxiliary power supply configured to assist the second power supply; and a second switch configured to perform a switching operation so that the power from the single power source is input to at least one of the second power supply and the second auxiliary power supply.

The first display apparatus may include a user input receiver to receive a user command.

The plurality of display apparatuses included in the display system may be driven in sequence by one command received from the user input receiver in the first display apparatus.

According to an aspect of another exemplary embodiment, there is provided a method of controlling a display system including a plurality of display apparatuses, the method including: supplying power from a single power source to a first display apparatus and a second display apparatus among the plurality of apparatuses; staring operation of the first display apparatus; starting operation of the second display apparatus after the first display apparatus enters a normal driving state; and displaying individual images on the first display apparatus and the second display apparatus to constitute a multi-screen.

The method further includes outputting a control signal informing the normal driving state when the first display apparatus enters the normal driving state, wherein the second display apparatus starts operation by receiving the control signal from the first display apparatus.

The method further includes receiving power from the power source and outputting, by the first display apparatus, a power signal corresponding to the normal driving state when entering the normal driving state, wherein the second display apparatus starts operation in response to the power signal output from the first display apparatus.

The first display apparatus may start operation by receiving a user command from a user input receiver.

The plurality of display apparatuses included in the display system may be driven in sequence by one command received from the user input receiver in the first display apparatus.

According to an aspect of another exemplary embodiment, there is provided a display system including: a first display apparatus including: a first power supply configured to supply power; a first auxiliary power supply configured to assist the first power supply; a first controller configured to output a control signal informing a normal driving state if normal driving power is output from the first power supply and the first auxiliary power supply; a first display configured to display an image to constitute a multi-screen; and a second display apparatus including a second power supply configured to supply power; a second auxiliary power supply configured to assist the first power supply; a second controller configured to start operation in response to receiving the control signal informing the normal driving state from the first display apparatus; and a second display configured to display an image to constitute the multi-screen.

The first display apparatus may include a user input receiver to receive a user command.

The first display apparatus and the second display apparatus are driven in sequence by one command received from the user input receiver in the first display apparatus.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Exemplary embodiments will be described in detail with reference to accompanying drawings. The present disclosure may be achieved in various forms and not limited to the following embodiments. For convenience of description, parts not directly related to the present disclosure are omitted, and like numerals refer to like elements throughout.

Figure 1:
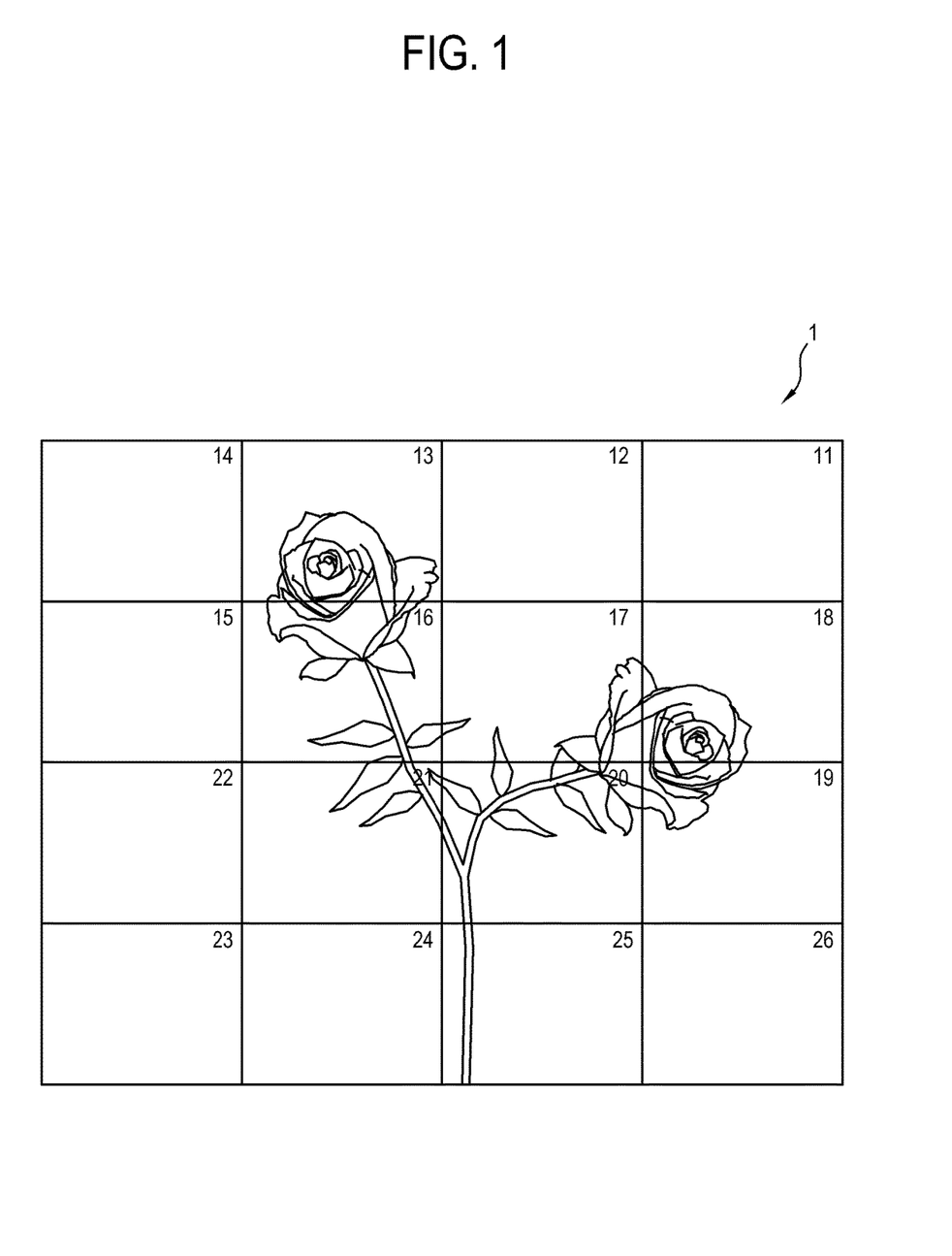
FIG. 1 shows an example of a multi-screen in a display system according to an exemplary embodiment.

FIG. 1 shows an example of a multi-screen in a display system 1 according to an exemplary embodiment. Individual images displayed on a plurality of display apparatuses 11~26 in the display system 1 constitute a multi-screen displaying a flower image.

Figure 2:
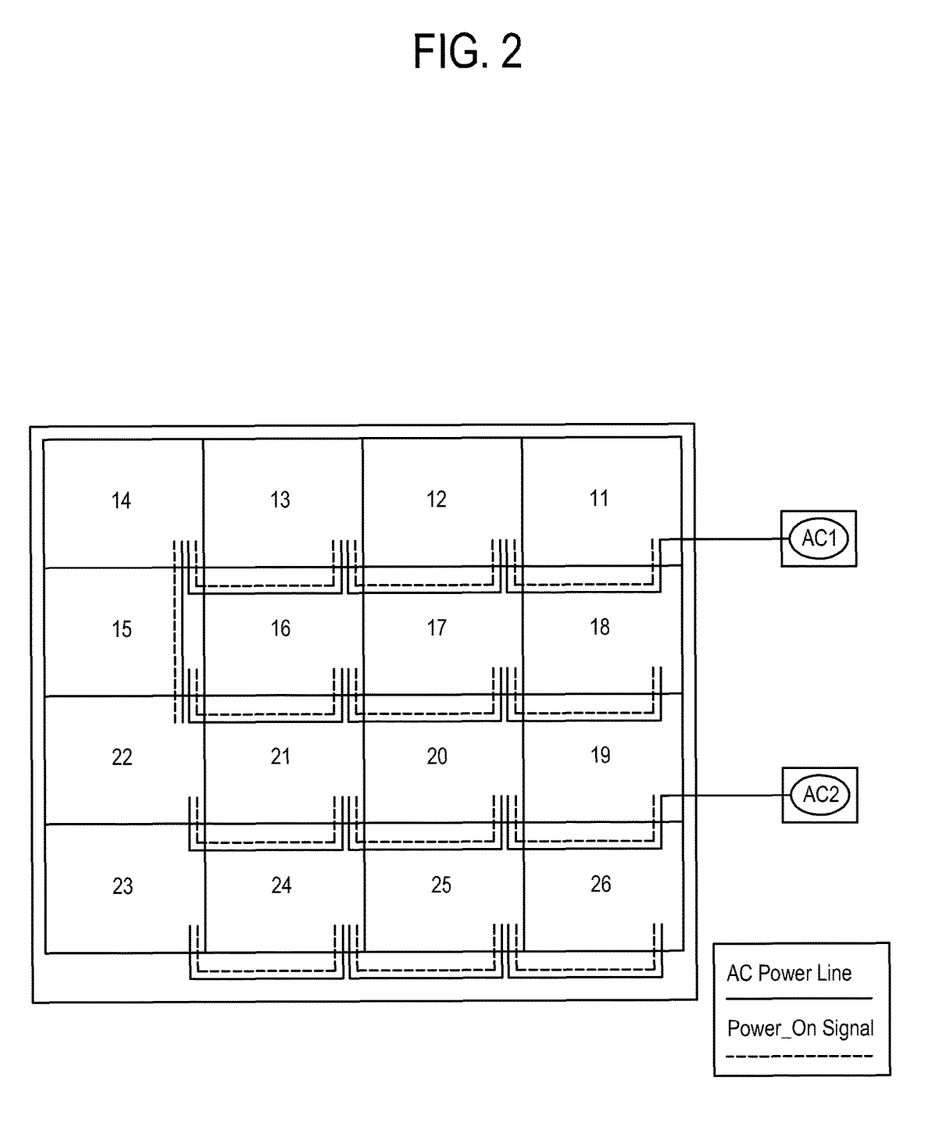
FIG. 2 shows an example of a power line and a control signal in the display system according to an exemplary embodiment.

FIG. 2 shows an example of a power line and a control signal in the display system according to an exemplary embodiment.

Referring to FIG. 2, a plurality of display apparatuses 11~18 may be grouped to connect to one power source AC1 and be supplied with power from the power source AC1, and a plurality of display apparatuses 19~26 may be grouped to connect to one power source AC2 and be supplied with power from the power source AC2. The display system 1 employs two power sources AC1 and AC2, but not limited thereto. Alternatively, all the plurality of display apparatuses 11~26 may be grouped to connect to one power source or to connect to at least three power sources. By comparison with a conventional system where the power sources are individually connected to the plurality of display apparatuses, the display system 1 according to an exemplary embodiment may reduce costs and time taken in the connection for the power source.

The plurality of display apparatuses 11~26 are connected to the power sources AC1 and AC2 through power lines to receive power from the power sources AC1 and AC2. The display apparatuses 11~26 may be sequentially driven. The display system 1 may include a control signal line A (see FIG. 3) to transmit control signals for sequentially driving the plurality display apparatuses 11~26. The plurality of display apparatuses 11~26 according to an exemplary embodiment may start operating in sequence, thereby causing no problem in supplying power by comparison with the system where all the display apparatuses 11~26 start operating at the same time. For example, a preceding display apparatus (e.g., display apparatus 11) is first driven, and then the following display apparatus (e.g., display apparatus 12) is automatically started in response to the control signal, thereby improving a user's convenience as compared with the system where the display apparatuses are driven one by one.

Figure 3:
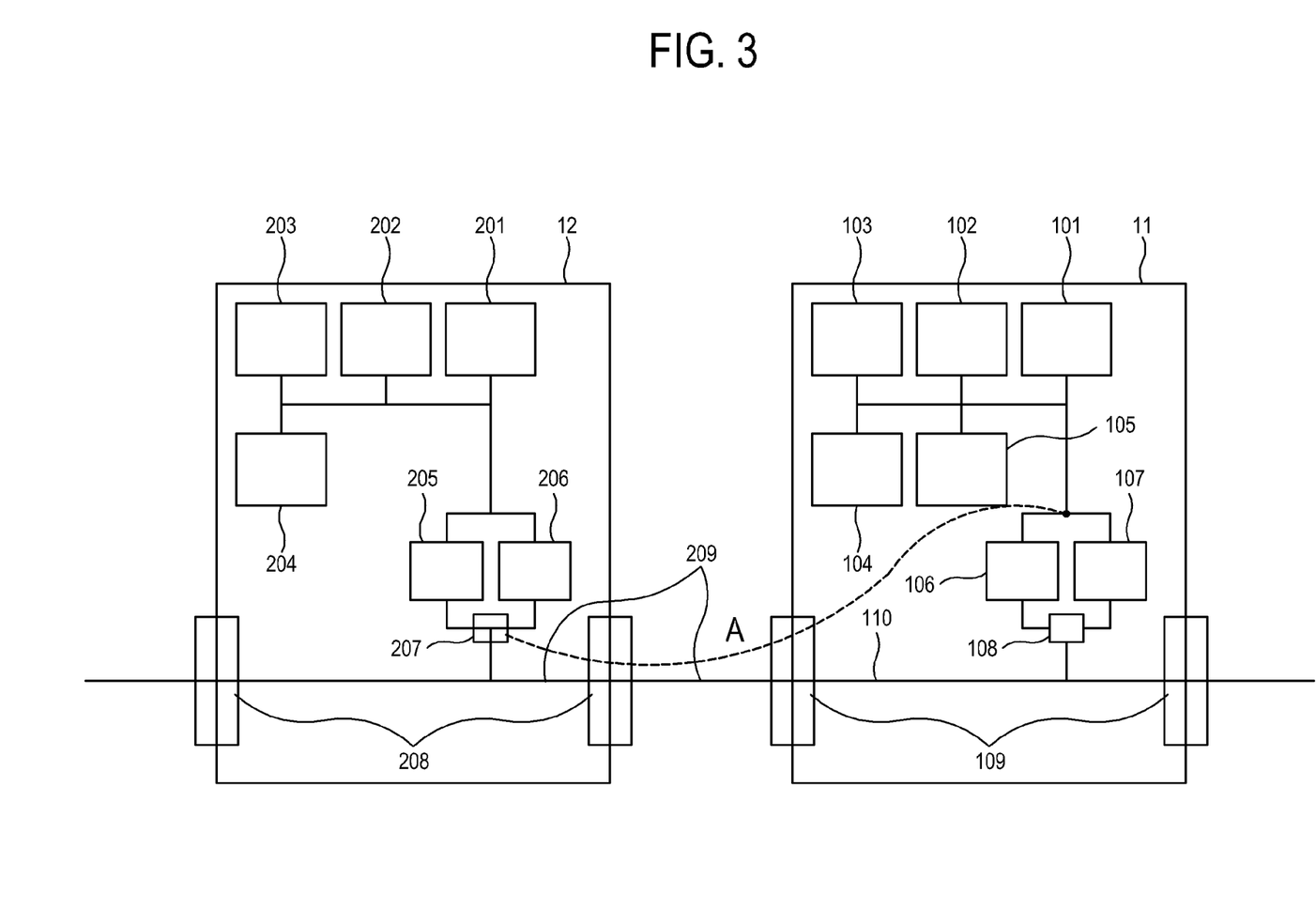
FIG. 3 is a block diagram of a first display apparatus and a second display apparatus in the display system according to an exemplary embodiment.

FIG. 3 is a block diagram of a first display apparatus 11 and a second display apparatus 12 included the display system 1 according to an exemplary embodiment.

The first display apparatus 11 may include a first connector 109 having a first power line 110 connected to a power source, a first image receiver 101, a first image processor 102, a first display 103, a user input receiver 105, a first switch 108, a first power supply 106, a first auxiliary power supply 107, and a first controller 104.

The first connector 109 includes the first power line 110 connected to the power source to receive power and connected to the second display apparatus 12.

The first image receiver 101 receives an image signal/image data through a wire or wirelessly and sends the received signal/data to the first image processor 102. The first image receiver 101 may receive a broadcast signal for a television (TV) as an image signal from a broadcast signal transmitter (not shown), an image signal from an imaging device such as a digital versatile disc (DVD) player, a Blu-ray disc (BD) player, etc., an image signal from a personal computer (PC), an image signal from a mobile device such as a smart phone, a smart pad, etc., an image signal through a network such as an Internet, or an image content as an image signal stored in a storage medium such as a universal serial bus (USB) storage medium. Alternatively, the image signal may be provided from the storage (not shown). The first image receiver 101 may be variously achieved in accordance with formats of the received image signal and types of the display apparatuses 11~26. For example, the first image receiver 101 may receive an image signal based on radio frequency (RF), composite video, component video, super video, Syndicat des Constructeurs d'Appareils Radiorécepteurs et Téléviseurs (SCART), high definition multimedia interface (HDMI), DisplayPort, unified display interface (UDI), wireless high definition (HD), or the like standards. If the received image signal is a broadcast signal, the first image receiver 101 may include a tuner to be tuned to a channel for receiving the broadcast signal.

The first image processor 102 may perform various image processing processes including, for example, a de-multiplexing for dividing a predetermined signal into signals according to characteristics, a decoding corresponding to various formats of an image signal, a de-interlacing for converting an interlaced image signal into a progressive image signal, a noise reduction for improving image quality, a detail enhancement, a frame refresh rate conversion, etc. The first image processor 102 may include a decoder (not shown) for decoding a source image in accordance with the formats of the encoded source image, and a frame buffer (not shown) for storing the decoded source image in units of frame.

The first image processor 102 may be achieved by a system-on-chip (SoC) in which various functions are integrated, or by an image processing board (not shown) in which individual elements for independently performing each of the processes are mounted on a printed circuit board. The first image processor 102 may be built-in the first display apparatus 11.

The first image processor 102 may perform various image processing processes previously set to a broadcast signal received by the first image receiver and a source image received from an image source (not shown). The first image processor 102 may output a processed image signal to the first display 103 so that the first display apparatus 11 can display the processed image.

The first display 103 may display an image based on the image signal output from the first image processor 102. The first display 103 may be achieved by liquid crystal, plasma, a light emitting diode (LED), an organic light-emitting diode (OLED), a surface-conduction electron-emitter, a carbon nano-tube (CNT), nano-crystal, or the like.

The first display 103 may include additional elements in accordance with its type. For example, if the first display 103 is achieved by the liquid crystal, the first display 103 may include a liquid crystal display (LCD) panel (not shown), a backlight unit (not shown) for emitting light to the LCD panel, and a panel driving substrate (not shown) for driving the panel (not shown).

The first display 103 displays an image based on the image signal processed by the image processor 102. The first display 103 may be achieved by the LCD, the PDP, the OLED, etc., and may include an LCD panel, a PDP panel, an OLED panel, etc.

The first display 103 may display an image and a color-compensation procedure. The first display 103 may include a display panel on which an image is displayed, and a panel driver which drives the display panel to display an image based on the processed image signal, but not limited thereto. The image signal received from an external input source through an interface (not shown) may be displayed on the first display 103 by the image processing process such as decoding, de-interlacing, scaling, etc. If the first controller (to be described later) performs the color compensation in accordance with a user's command, the first display 103 may display the color-compensation procedure including a color patch and a color compensation status window, etc.

The user input receiver 105 sends the first controller 104 a variety of control commands or information received in response to a user's control and input. The user input receiver 105 may be achieved by a menu-key or input panel installed outside the first display apparatus 11, or a remote controller separated from the first display apparatus 11. Further, the user input receiver 105 may be integrated with the first display 103. If the first display 103 is a touch screen, a user may touch an input menu (not shown) displayed on the first display 103 so that a preset command can be transmitted to the first controller 104.

The user input receiver 105 may receive a user's motion and voice. A user's motion may include a touch input. The user input receiver 105 may directly receive a user's motion and voice, or may receive information about a user's motion and voice from an external device (not shown).

The first switch 108 may allow power received through the first connector 109 to be supplied to at least one of the first power supply 106 and the first auxiliary power supply 107. The first switch 108 may perform a switching operation to use power from both the first power supply 106 and the first auxiliary power supply 107, and may perform a switching operation to use one of the first power supply 106 and the first auxiliary power supply 107 if the other one of the first power supply 106 and the first auxiliary power supply 107 has an error.

The first power supply 106 and the first auxiliary power supply 107 have the same configuration, and are provided to make preparation for an error in either of them. The alternating current (AC) power supplied from the power source is converted into direct current (DC) power and used for internal devices of the first display apparatus 11.

The first controller 104 serves to perform overall control for the internal devices of the first display apparatus 11. If normal driving power is output from the first power supply 106 and the first auxiliary power supply 107, the first controller 104 outputs the control signal for starting the normal operation of the second display apparatus 12 to the second switch 207 or the second controller 204 of the second display apparatus 12 through the control signal line A.

The second display apparatus 12 may have the same configurations and functions as those of the first display apparatus 11 except the user input receiver 105. The second display apparatus 12 does not include the user input receiver because only the first display apparatus 11 needs a user command to start operation. That is, the second display apparatus 12 does not receive a user command to start operation. As shown in FIG. 3, if the first power supply 106 and the first auxiliary power supply 107 of the first display apparatus 11 convert the AC power into the DC power and output voltages usable for the devices, a signal indicating that the normal driving power is output from the first power supply 106 and the first auxiliary power supply 107 is transmitted to the second switch 207 of the second display apparatus 12. According to an exemplary embodiment, the second switch 207 allows the power from the power source to be supplied to the second power supply 205 and the second auxiliary power supply 206. A switch (not shown) may be provided for operating the second switch 207 with the normal driving power output from the first power supply 106 and the first auxiliary power supply 107. According to another exemplary embodiment, if the normal driving power is input to the first controller 104, the first controller 104 transmits a signal of a normal driving state to at least one of the second switch 207 and the second controller 204 of the second display apparatus 12, so that the second display apparatus 12 can start operation after the first display apparatus 11 enters the normal operation. The second display apparatus 12 may include a charger or a battery so that the second controller 204 can stay awake, thereby controlling the second display apparatus 12 to operate when receiving the signal of the normal driving state from the first display apparatus 11.

If the plurality of display apparatuses 11~18 are driven in sequence, it is possible to solve the problem of supplying the power, which arises since the power instantaneously consumed in simultaneously driving the display apparatuses 11~18 at an initial stage is higher than that consumed in the normal driving state. Accordingly, there is no problem in driving all the plurality of display apparatuses 11~18 of the display system 1, since the power consumption is sequentially distributed.

Figure 4:
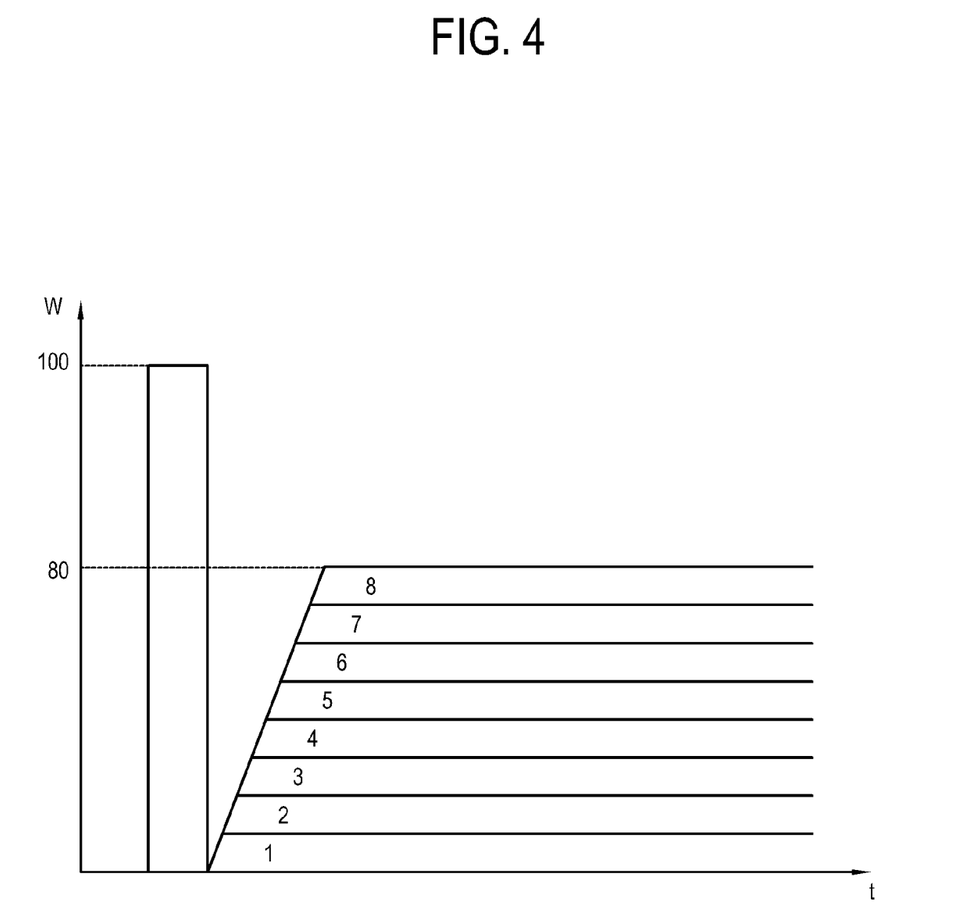
FIG. 4 is a graph showing power against time when the plurality of display apparatuses are simultaneously driven in the display system of the related art.

FIG. 4 is a graph showing power against time when the plurality of display apparatuses are simultaneously driven in the display system of the related art.

If the plurality of display apparatuses receives power from a single power source and starts operation at the same time, the current instantaneously used at the initial operation is higher than that in the normal driving state, and therefore the power consumed prior to the normal driving state is greater than the power consumed in the normal driving state. As shown in FIG. 4, if power needed for driving one of the display apparatuses is 10 W, total power needed for driving eight display apparatuses 11~18 has to be 80 w. However, FIG. 4 shows that 100 w is consumed until entering the normal driving state. In this case, if power of 90 w is supplied, the plurality of display apparatuses 11~18 may have troubles with operations since the plurality of display apparatuses 11~18 need 100 w to enter the simultaneously driving the display apparatuses 11~18 at an initial stage.

Figure 5:
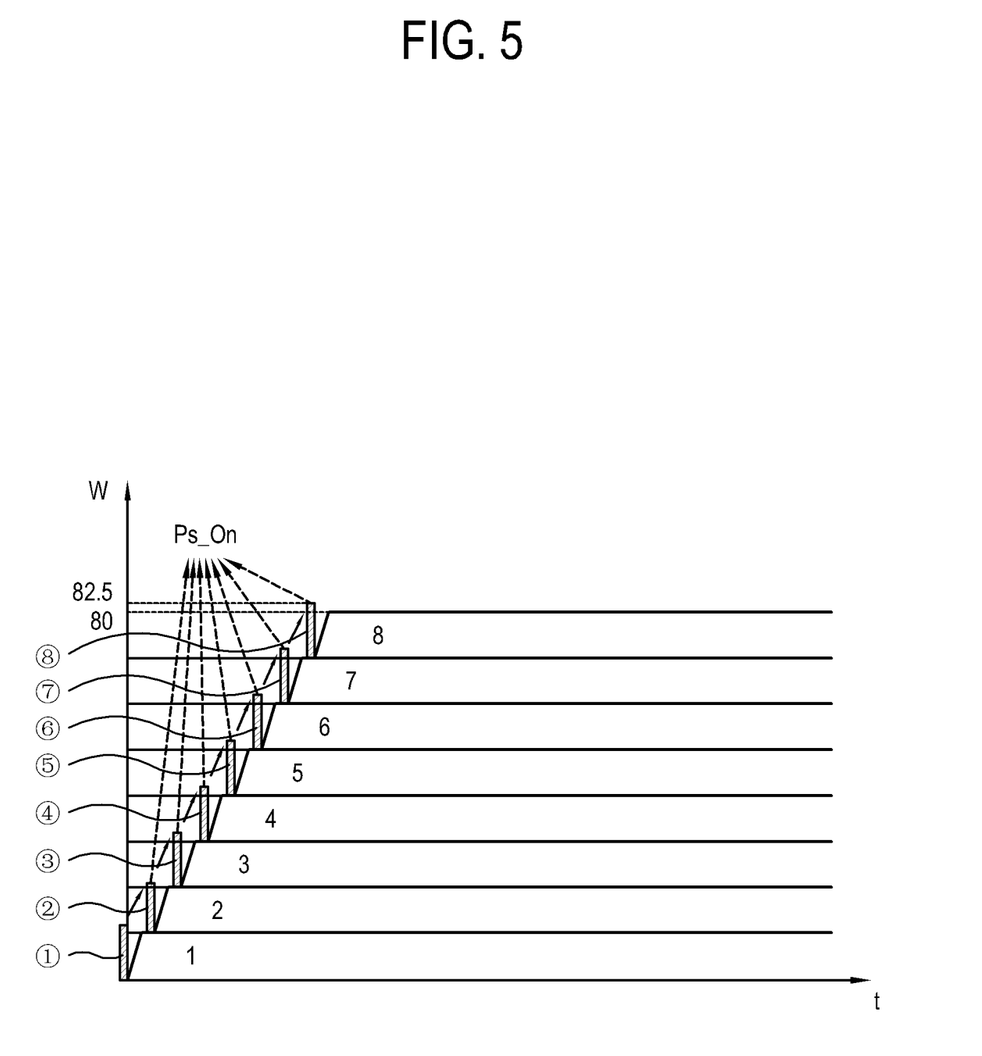
FIG. 5 is a graph showing power against time when the plurality of display apparatuses are sequentially driven in the display system according to an exemplary embodiment.

FIG. 5 is a graph showing power against time when the plurality of display apparatuses 11~18 are sequentially driven in the display system 1 according to an exemplary embodiment.

Referring to FIG. 5, the display apparatuses 11~18 are respectively driven at different points of time to avoid consuming the higher current at the initial state than that in the normal driving state, so that the sections in which the higher current is consumed by the plurality of display apparatuses 11~18 than that in the normal driving state can be prevented from overlapping with one another.

If power needed for driving the first display apparatus 11 is 10 W, the first display apparatus 11 instantaneously consumes power of 12.5 w at the initial stage, which is greater than that in the normal driving state, and then consumes 10 w while operating in the normal driving state. When the first display apparatus 11 is in the normal driving state, the second display apparatus 12 starts operating to instantaneously consume power of 12.5 w at its initial stage, which is greater than that in the normal driving state, and then consumes 10 w while operating in the normal driving state. In this way, the eighth display apparatus 18 is finally driven to instantaneously consume power of 12.5 w at its initial stage, which is greater than that in the normal driving state. As a result, the maximum power consumed in the first to eighth display apparatuses 11 to 18 is 82.5 w, and the normal driving power of 80 w is consumed after the eighth display apparatus 18 enters the normal driving state.

Accordingly, in the display system 1 according to an exemplary embodiment, the respective display apparatuses 11~18 is started in sequence, and thus a problem in supplying power does not arise by comparison with the case where all the display apparatuses 11~18 are simultaneously started.

In FIG. 5, the plurality of display apparatuses 11~18 are respectively driven at different points of time, but not limited thereto. Alternatively, the plurality of display apparatuses 11~18 may be grouped, and the groups may be respectively driven at different points of time as long as the power consumed by each group of display apparatuses 11~18 at the initial stage, which is greater than that in the normal driving state, does not exceed the power supplied from the power source. For example, four display apparatuses 11~14 may be grouped to simultaneously receive power and start operations, and then the next four display apparatuses 15~18 may be grouped to simultaneously receive power and start operations.

Figure 6:
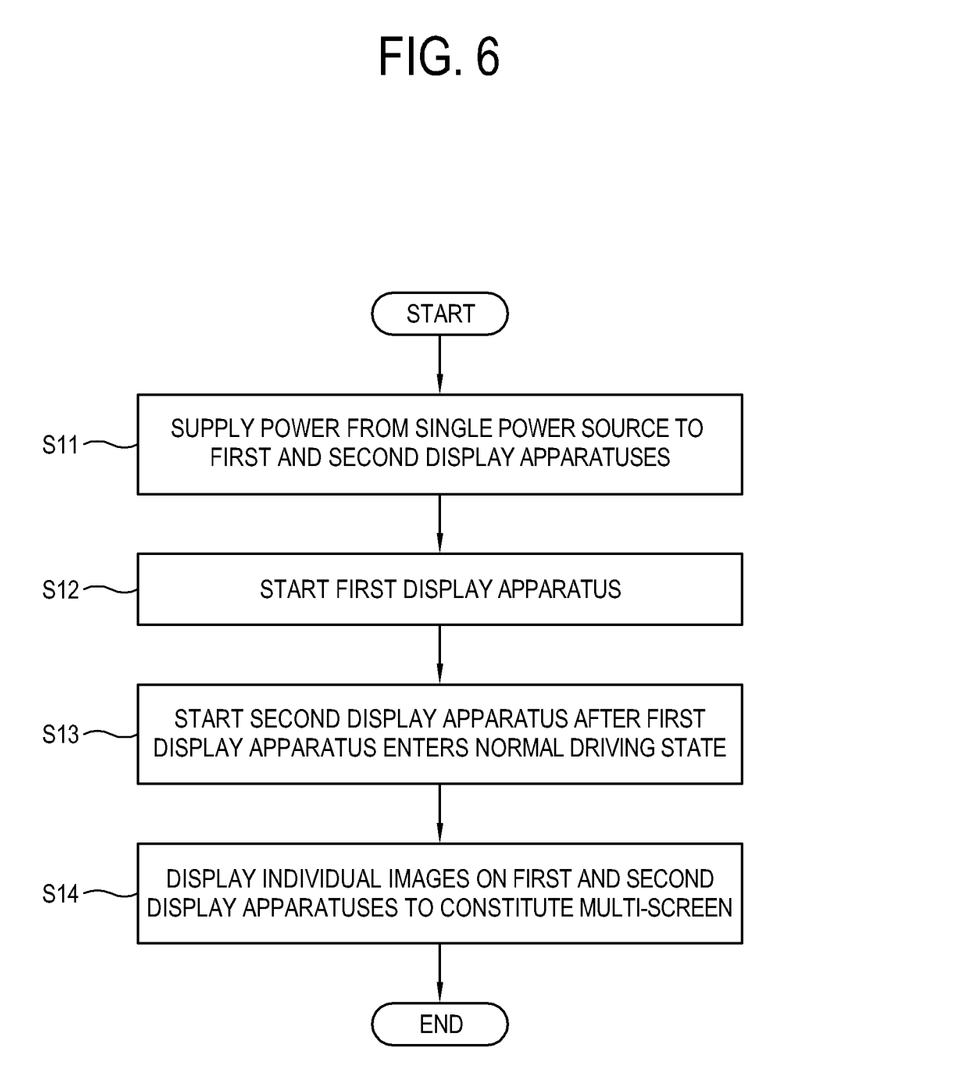
FIG. 6 is a flowchart showing operations of the display system according to an embodiment.

FIG. 6 is a flowchart showing operations of the display system 1 according to an embodiment.

The first display apparatus 11 and the second display apparatus 12 receive power from a single power source (operation S11).

The first display apparatus 11 starts operation (operation S12).

After the first display apparatus 11 enters the normal driving state, the second display apparatus 12 starts operation (operation S13).

The first display apparatus 11 and the second display apparatus 12 respectively display individual images to constitute a multi-screen (operation S14).

Figure 7:
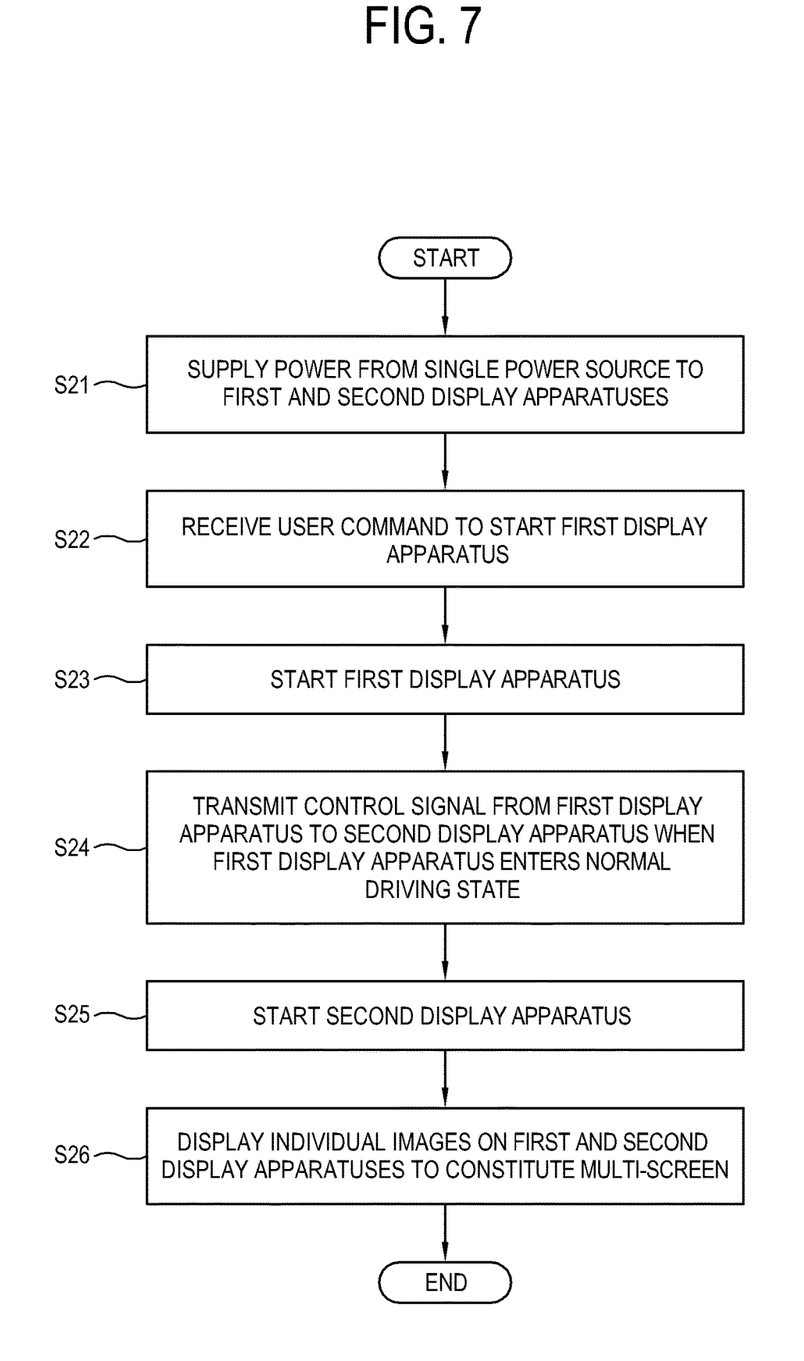
FIGS. 7 and 8 are flowcharts showing operations of the display system according to exemplary embodiments.

FIG. 7 is a flowchart showing operations of the display system 1 according to an exemplary embodiment.

The first display apparatus 11 and the second display apparatus 12 receive power from a single power source (operation S21).

The first display apparatus 11 receives a user's command for starting (operation S22).

The first display apparatus 11 starts operation (operation S23).

When the first display apparatus 11 enters the normal driving state, the control signal output from the first display apparatus 11 is transmitted to the second display apparatus 12 (operation S24).

The second display apparatus 12 starts operation (operation S25).

The first display apparatus 11 and the second display apparatus 12 respectively display individual images to constitute a multi-screen (operation S26).

Figure 8:
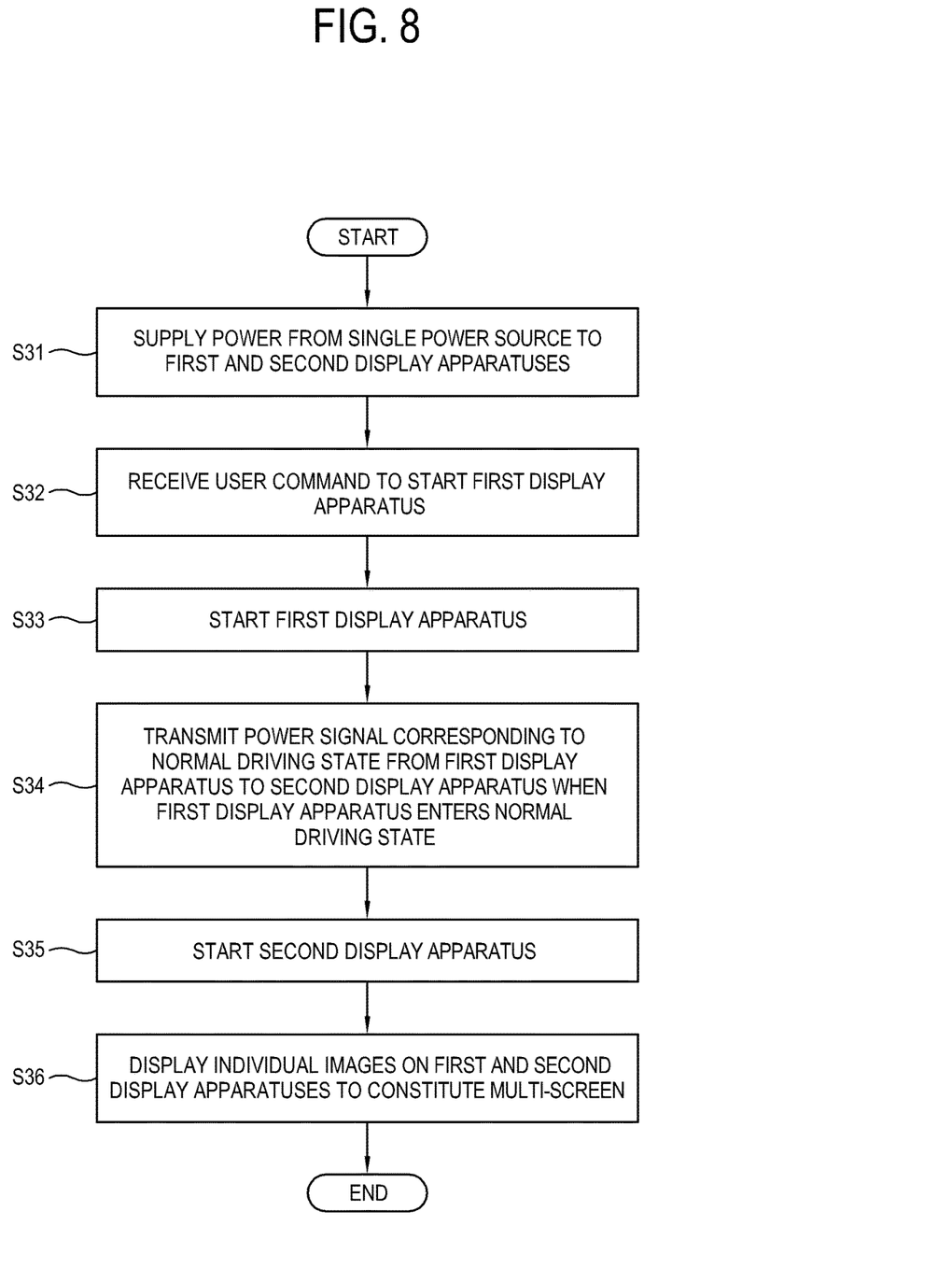

FIG. 8 is a flowchart showing operations of the display system according to an exemplary embodiment.

The first display apparatus 11 and the second display apparatus 12 receive power from a single power source (operation S31).

The first display apparatus 11 receives a user's command for starting (operation S32).

The first display apparatus 11 starts operation (operation S33).

When the first display apparatus 11 enters the normal driving state, the second display apparatus 12 receives a power signal corresponding to the normal driving state from the first display apparatus 11 (operation S34).

The second display apparatus 12 starts operation (operation S35).

The first display apparatus 11 and the second display apparatus 12 respectively display individual images to constitute a multi-screen (operation S36).

With the foregoing display system 1, if the plurality of display apparatuses 11~26 are driven by receiving power from a single power source, the plurality of display apparatuses 11~26 are respectively driven in sequence, so that the plurality of display apparatuses 11~26 can respectively display individual images without any problem at the initial operation. Further, it is convenient for a user since one command for driving the first display apparatus 11 is enough to drive all the plurality of display apparatuses 11~26 without turning on the plurality of display apparatuses one by one.

As described above, in order to display a multi-screen formed by the individual images respectively displayed on the plurality of display apparatuses in the display system, the plurality of display apparatuses are respectively driven in sequence, thereby having an effect on solving the problem of supplying the power at the initial stage.

Further, it is convenient for a user since the user has only to issue a command once to drive the display system including the plurality of display apparatuses.

Although a few exemplary embodiments have been shown and described, it will be appreciated by those skilled in the art that changes may be made in these exemplary embodiments without departing from the principles and spirit of the inventive concept. Therefore, the foregoing has to be considered as illustrative only. The scope of the inventive concept is defined in the appended claims and their equivalents. Accordingly, all suitable modification and equivalents may fall within the scope of the inventive concept.

What is claimed is:

1. A display system including a plurality of display apparatuses comprising;
   a first display apparatus configured to display an image; and
   a second display apparatus configured to display an image,
   wherein the second display apparatus receives initial driving power from a power source while the first display apparatus receives the initial driving power from the power source if a sum of the initial driving powers of the first display apparatus and the second display apparatus is lower than an available power from the power source, and the second display apparatus receives the initial driving power from the power source after the first display apparatus receives the initial driving power from the power source and enters a normal driving state if the sum of the initial driving powers of the first display apparatus and the second display apparatus is higher than the available power from the power source,
   wherein the first display apparatus comprises a user input receiver to receive a user command, and
   wherein the plurality of display apparatuses included in the display system are driven in sequence by one command received from the user input receiver in the first display apparatus.

2. The display system according to claim 1, wherein the first display apparatus outputs a control signal informing the normal driving state when entering the normal driving state, and
   the second display apparatus starts operation by receiving the control signal from the first display apparatus.

3. The display system according to claim 1, wherein the first display apparatus receives the initial driving power from the power source and outputs a power signal corresponding to the normal driving state when entering the normal driving state, and
   the second display apparatus starts operation by receiving the power signal from the first display apparatus.

4. The display system according to claim 1, wherein the first display apparatus comprises a first connector comprising a first power line connected to the power source, and the second display apparatus comprises a second connector comprising a second power line connected to the first power line of the first connector.

5. A method of controlling a display system including a plurality of display apparatuses comprising a first display apparatus and a second display apparatus, the method comprising:
   receiving, by the second display apparatus, initial driving power from a power source while the first display apparatus receives the initial driving power from the power source if a sum of the initial driving powers of the first display apparatus and the second display apparatus is lower than an available power from the power source, or receiving the initial driving power from the power source after the first display apparatus receives the initial driving power from the power source and enters a normal driving state if the sum of the initial driving powers of the first display apparatus and the second display apparatus is higher than the available power from the power source; and
   displaying individual images on the first display apparatus and the second display apparatus to constitute a multi-screen,
   wherein the first display apparatus starts operation by receiving a user command from a user input receiver, and
   wherein the plurality of display apparatuses included in the display system are driven in sequence by one command received from the user input receiver in the first display apparatus.

6. The method according to claim 5, further comprising:
   outputting a control signal informing the normal driving state when the first display apparatus enters the normal driving state,
   wherein the second display apparatus starts operation by receiving the control signal from the first display apparatus.

7. The method according to claim 5, further comprising:
   receiving the initial driving power from the power source and outputting, by the first display apparatus, a power signal corresponding to the normal driving state when entering the normal driving state,
   wherein the second display apparatus starts operation in response to the power signal output from the first display apparatus.

* * * * *